(No Model.)

L. H. NASH.
CONNECTING ROD FOR PISTONS, &c.

No. 334,035. Patented Jan. 12, 1886.

2 Sheets—Sheet 1.

Witnesses:
R. E. Grant
Fred P. Metzger

Inventor:
Lewis Hallock Nash
by Johnson and Johnson
Attys.

(No Model.) 2 Sheets—Sheet 2.

L. H. NASH.
CONNECTING ROD FOR PISTONS, &c.

No. 334,035. Patented Jan. 12, 1886.

Witnesses:-

Inventor:-
Lewis Hallock Nash
by Johnson and Johnson
Atty.

UNITED STATES PATENT OFFICE.

LEWIS HALLOCK NASH, OF BROOKLYN, ASSIGNOR TO THE NATIONAL METER COMPANY, OF NEW YORK, N. Y.

CONNECTING-ROD FOR PISTONS, &c.

SPECIFICATION forming part of Letters Patent No. 334,035, dated January 12, 1886.

Application filed June 3, 1885. Serial No. 167,478. (No model.)

*To all whom it may concern:*

Be it known that I, LEWIS HALLOCK NASH, a citizen of the United States, residing at Brooklyn, in the county of Kings and State of New York, have invented new and useful Improvements in Connecting-Rods for Pistons, &c., of which the following is a specification.

The object of my improvement is to provide rolling or rocking bearings for a connecting-rod, to avoid the necessity of lubrication for such bearings, and to prevent friction of the bearing-joints in the substitution of a rolling contact-bearing for the usual sliding motion of journal-bearings and crank-pins.

My improved connecting-rod is applicable to machinery in which a rectilinear-moving device is operated by a pivoted rocker-arm having abutting bearings for said rod, and particularly for connections for devices in which a rectilinear movement—such as a piston of an engine—is converted into a rotary motion, or a rotary into a rectilinear movement.

As an instance of the application of my improved connecting-rod device, I have shown it as applied to the piston of a gas-engine; but it may be used in any kind of machinery where it is required to transmit the motion of a rocking arm to a rectilinear-moving device.

Figure 1:
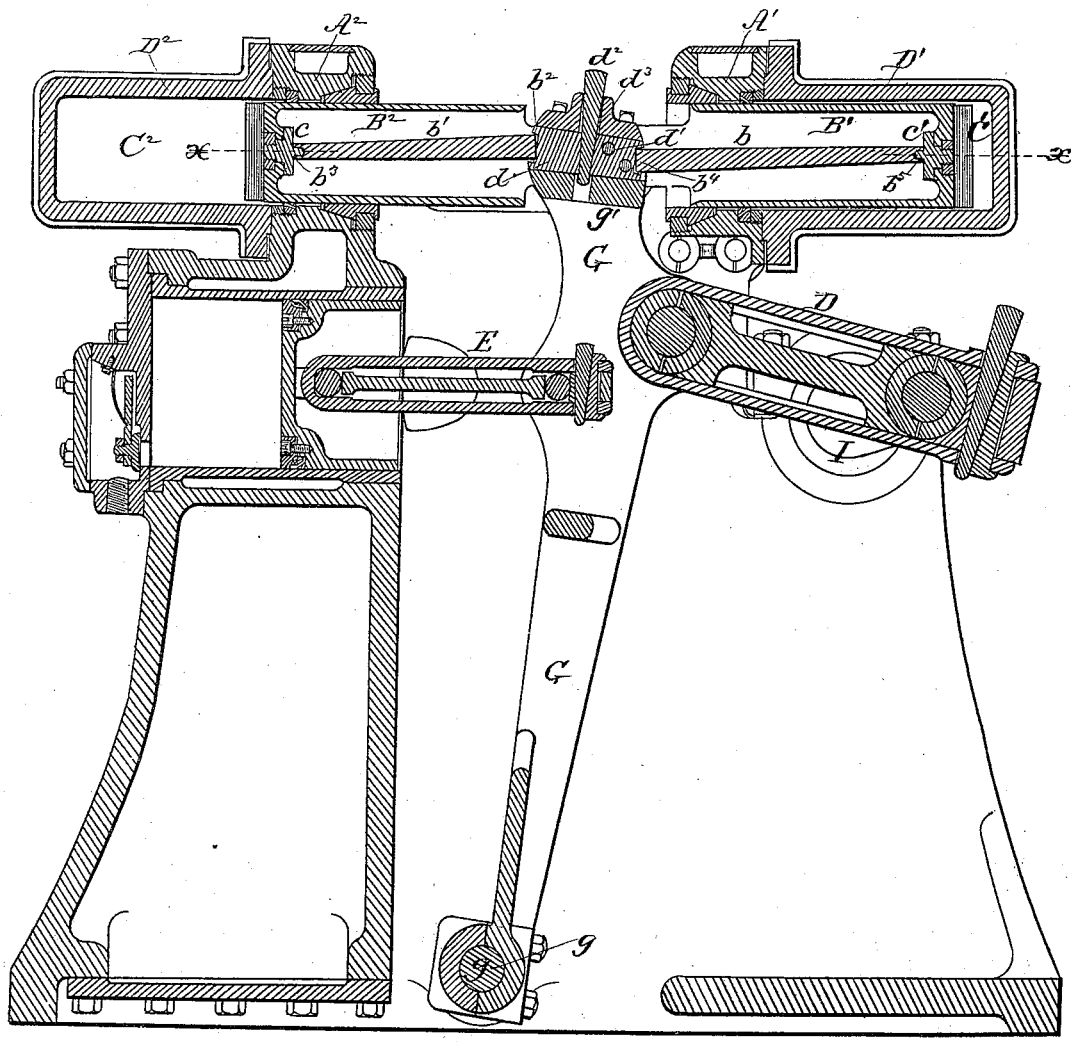
Figure 2:
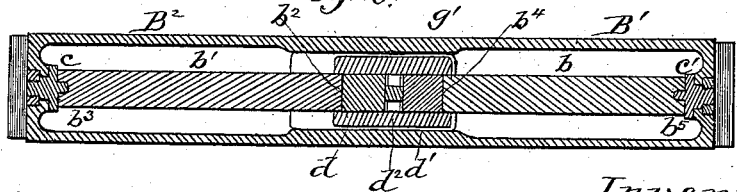
Figure 4:
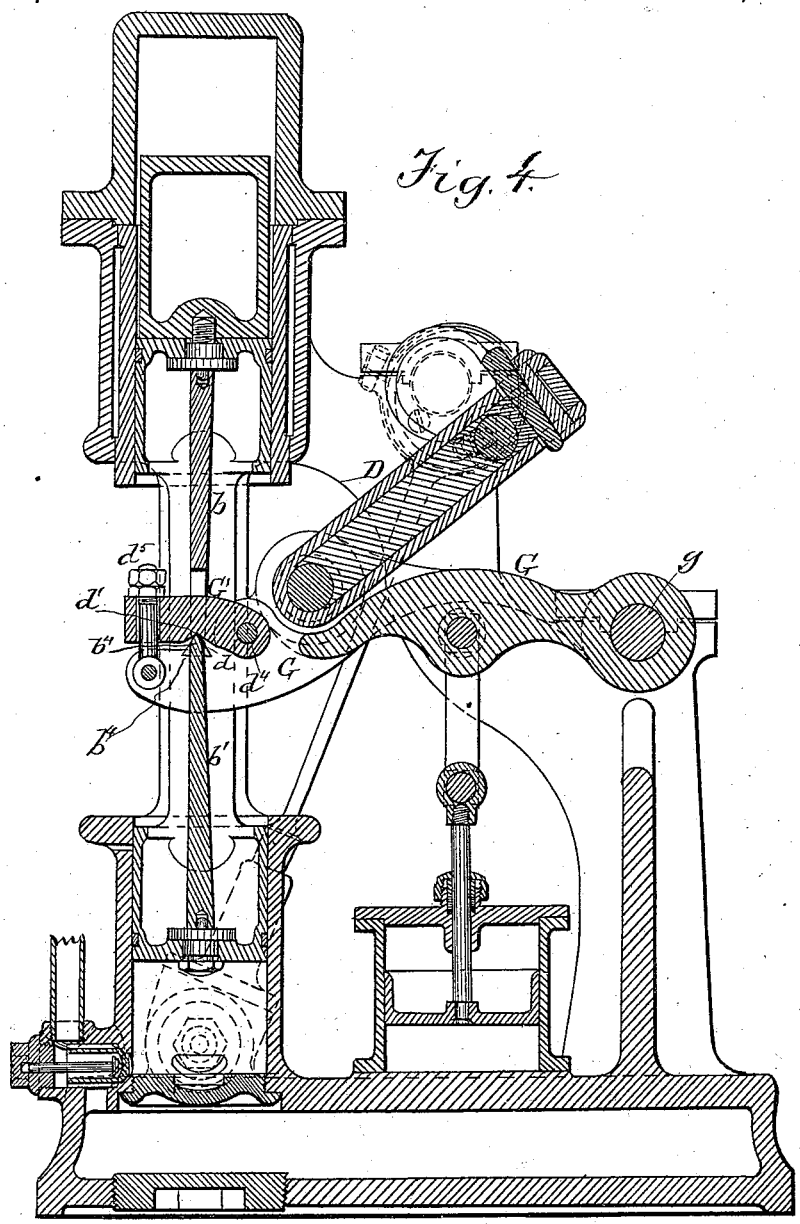
Figure 3:
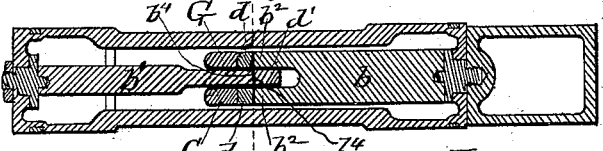

In the accompanying drawings, Figure 1 represents in vertical section my improved connecting-rod device as applied to a double-acting gas-engine of what is known as the "trunk" form. Fig. 2 represents a longitudinal central section of the connecting-rod, taken on the line $x\,x$ of Fig. 1. Fig. 3 represents a similar sectional view of a connecting-rod having a modified form of rocker-arm bearing, and Fig. 4 shows the application of this modified form of rocker-arm bearing to a single-acting gas-engine and air-compressor.

These two illustrations embody my invention as applied to separate and independent connecting-rods operating in the same plane, but constituting, in fact, a single connecting-rod.

$A'\,A^2$ represent the engine-cylinders, and $D'\,D^2$ the extended caps thereof, which form the combustion-chambers $C'\,C^2$, arranged in line with each other for the operation of a double-ended piston or plunger, $B'\,B^2$, which constitutes the rectilinear-moving device to which my improved connecting-rod is applied. The trunk of the double-ended piston has an opening at the middle of its length to receive the end of a vibratable or rocking arm, G, which swings on a bearing, $g$, so that its non-pivoted end moves in an arc of which the bearing $g$ is the center. The rectilinear-moving device or double-ended piston is connected by separate rods $b\,b'$ to the non-pivoted end of the rocker-arm G, so as to drive it back and forth with the movement of the pistons. This movement of the rocker-arm is communicated to a crank-shaft, I, by a connecting-rod, D, whereby the reciprocating motion of the piston is converted into a rotary motion of the crank-shaft, or into a rectilinear movement by a connecting-rod, E, or both, as may be required.

So much is stated to give an instance of an organized machine in which my improved connecting device may be used. The separate connecting-rods $b'\,b^2$ have bearings in the rectilinear-moving device and in the non-pivoted end of the vibratable or rocker arm. For this purpose the latter has a suitable seat, $g'$, referring to Fig. 1, within and upon which is firmly secured a bearing-block, $d'$, and an adjustable bearing-block, $d$, held within and upon its seat by a plate, $d^3$, both bearing-blocks being of steel and forming abutting bearings for the ends of the connecting-rods. In the blocks $d\,d'$ the bearing-surfaces are formed upon arcs struck from a center between them, and in the rods the bearing ends $b^2\,b^4$ are formed upon arcs struck from their bearings upon the rectilinear-moving device, thereby giving, substantially, points of contact-bearing of the rods upon the rocker-arm. The other ends of the connecting-rods have bearings upon the rectilinear-moving device, which, as shown, are within the trunks of the pistons. These piston-bearings are formed of steel seats $c\,c'$, with substantially flat bearing-faces, and a central projection or point, while the connecting-rods are formed with curved bearing ends $b^3\,b^5$, and a recess formation fitting the seat-projections by which the rods are held in proper relation to said seats.

These bearings $b^2 b^3 b^4 b^5$, being thus formed of proper dimensions, will always roll in rocking contact with each other in all positions of the rectilinear-moving device or piston and of the rocker-arm, and therefore these bearings will require no lubrication and will operate without friction. In a gas-engine these advantages are of special importance, because the heat of the engine dries and cakes the lubricant, and the reduction of the friction to a minimum gives a smooth and steady working to the engine.

A key, $d^2$, driven into the cap-plate $d^3$ between the bearing-blocks, serves to force out the adjustable bearing-block $d$, as may be required to take up lost motion of the parts.

My improvement is not confined to any particular form of bearing-surfaces, since, if the shape of any one of them is changed a corresponding coacting surface must be formed for one or more of the other bearing-surfaces, which will fulfill the conditions of rolling contact with its seat; hence I have shown in Figs. 3 and 4 a modification in the form of knife-edge bearings for the rocker-arm. In this modification one of the piston connecting-rods, $b$, is forked at its bearing end $b^2$, and bears upon knife-edges $d$, which are seated in the rocker-arm G, while the other piston connecting-rod, $b'$, terminates in a knife-edge, $b^4$, which bears upon a seat, $d'$, formed in a supplemental lever-arm, G', pivoted to the rocker-arm by a pin, $d^4$, and, crossing the bearings, is adjustably secured to said rocker-arm by a screw-bolt, $d^5$. In this plan the lost motion is taken up by adjusting the supplemental lever G' by the screw-bolt $d^5$ and its nut-lock, and when so adjusted the knife-edge bearings must be in line, as in Fig. 4.

The bearing end of the rocker-arm stands between the uniting arms of the trunk-pistons, and is carried back and forth with them, describing an arc between the trunk-arms, while the pistons move in a right line, so that this movement of the rocker-arm gives it a slight rolling action upon the abutting ends of the connecting-rods, and the latter thereby a slight rolling action upon their piston-bearings.

In Figs. 1 and 3 the rectilinear-moving device is shown with connecting mechanism for giving both a rotary and a rectilinear motion by means of independent connecting-rods D E, and it may be so used with one or both for operating a crank-shaft and a piston; but matters referring to the engines shown in their constructions, combinations, and methods of operation are not claimed herein, as these things will form the subject of separate and distinct applications for patents by me.

I claim—

1. The combination, with a rectilinear-moving device, of a connecting-rod device therefor, consisting of separate and independent connecting-rods, and a vibratable or rocking arm having bearing-surfaces for the abutting ends of said connecting-rods, substantially as described, for the purpose specified.

2. The combination, with a rectilinear-moving device having bearing-seats, of a rocking or vibratable arm having bearing-seats on opposite sides and independent connecting-rods having rolling or rocking contact-seats upon the vibratable arm and upon the rectilinear-moving device, substantially as described, for the purpose specified.

3. The combination, in a connecting-rod device, of a rectilinear-moving device and a pivoted arm having its non-pivoted end entering an open way in said rectilinear-moving device at or about the middle of its length, provided with curved steel bearings on opposite sides, with independent connecting-rods having abutting and contact bearings upon the moving parts, and one or more operating-rods connecting the pivoted arm, substantially as herein described, for the purpose specified.

In testimony whereof I have hereunto set my hand in the presence of two subscribing witnesses.

LEWIS HALLOCK NASH.

Witnesses:
H. W. BRINCKERHOFF,
WILLIAM C. WESTERVELT.